(12) United States Patent
Russell et al.

(10) Patent No.: US 12,421,741 B2
(45) Date of Patent: *Sep. 23, 2025

(54) INBOARD-MOUNTED SAFETY LATCH MECHANISM FOR PREVENTING A WALKWAY PLATFORM FLIP DOOR FROM BEING RAISED WITHOUT A GUARDRAIL INSTALLED

(71) Applicant: The Boeing Company, Chicago, IL (US)

(72) Inventors: Don J. Russell, Arlington, WA (US); Brennan J. Dunlap, Snohomish, WA (US)

(73) Assignee: The Boeing Company, Arlington, VA (US)

( * ) Notice: Subject to any disclaimer, the term of this patent is extended or adjusted under 35 U.S.C. 154(b) by 1113 days.

This patent is subject to a terminal disclaimer.

(21) Appl. No.: 17/369,566

(22) Filed: Jul. 7, 2021

(65) Prior Publication Data
US 2023/0010425 A1     Jan. 12, 2023

(51) Int. Cl.
*E04G 1/15*     (2006.01)
*E04G 5/00*     (2006.01)
(Continued)

(52) U.S. Cl.
CPC .............. *E04G 1/15* (2013.01); *E04G 5/006* (2013.01); *E04G 5/14* (2013.01); *E05C 3/14* (2013.01);
(Continued)

(58) Field of Classification Search
CPC .. E04G 1/15; E04G 1/00; E04G 5/006; E04G 5/14; E04G 5/001; E04G 5/141;
(Continued)

(56) References Cited

U.S. PATENT DOCUMENTS 5,941,024 A * 8/1999 Journault ............ E02D 29/1463
182/112
6,138,812 A * 10/2000 Kimener ................. E06B 11/00
49/133
(Continued)

FOREIGN PATENT DOCUMENTS

CN    201793023 U   *   4/2011
CN    109733637 A   *   5/2019
(Continued)

OTHER PUBLICATIONS

Global Dossier Jan. 23, 2025.*
Extended European Search Report prepared by the European Patent Office in application No. EP 22 16 46662.3 dated Sep. 19, 2022.

*Primary Examiner* — Brian D Mattei
*Assistant Examiner* — Kathleen M. McFarland
(74) *Attorney, Agent, or Firm* — Walters & Wasylyna LLC (57) ABSTRACT

In an example, a system is described. The system includes a guardrail having a post, and the post having a post dog. The system also includes a latch eye configured to be coupled to a flip door. The system also comprises a safety latch mechanism configured to be coupled to a fixed structure and including a body, a socket configured to receive the post, and a door latch rotatably coupled to the body and biased in a latched position that is configured to engage with the latch eye and thereby retain the flip door in a lowered position. Based on the post being inserted into the socket of the safety latch mechanism, the post dog engages with and rotates the door latch from the latched position to an unlatched position, thereby allowing the flip door to be raised from the lowered position to a raised position.

20 Claims, 10 Drawing Sheets

(51) Int. Cl.
  *E04G 5/14* (2006.01)
  *E05C 3/00* (2006.01)
  *E05C 3/14* (2006.01)

(52) U.S. Cl.
  CPC ........ *E04G 2001/157* (2013.01); *E05C 3/006* (2013.01)

(58) Field of Classification Search
  CPC .......... E04G 2001/157; E04G 21/3233; E04G 21/3228; E05C 3/14; E05C 3/006; E05C 3/16; E05C 3/162; E05C 3/36; B64F 5/10; B64F 5/40; B66F 11/04; B66F 17/006; E05B 63/00; E05B 15/00; E05B 65/00; E04H 17/14; E04H 17/20; E04F 11/18; E04F 11/1865; E04F 2011/1868; E06B 3/38; E06B 11/00; E05Y 2201/434; B25H 1/20; B60R 3/005; E04B 57/00; E04B 35/008; E05D 11/1007; E05D 11/1014; Y10T 292/17
  See application file for complete search history.

(56) References Cited

U.S. PATENT DOCUMENTS

| | | | | |
|---|---|---|---|---|
| 7,841,645 B2* | 11/2010 | Diamond | .................. | B60P 3/34 |
| | | | | 296/165 |
| 8,365,472 B2* | 2/2013 | Grimaldi | ................. | B63B 17/04 |
| | | | | 114/364 |
| 8,403,109 B2* | 3/2013 | Bennett | ..................... | E06C 5/02 |
| | | | | 182/113 |
| 8,479,884 B2* | 7/2013 | Mizell | ....................... | E04G 3/00 |
| | | | | 182/141 |
| 9,027,712 B2* | 5/2015 | Melton | .................. | B65G 69/22 |
| | | | | 182/36 |
| 9,409,755 B2* | 8/2016 | Melton | .................... | B66F 11/04 |
| 10,730,372 B2* | 8/2020 | Roth | ....................... | B60P 1/435 |
| 11,156,008 B2* | 10/2021 | Phan | ........................ | B64F 5/60 |
| 11,319,713 B2* | 5/2022 | O'Keefe | .................. | B66F 11/04 |
| 11,512,477 B2* | 11/2022 | Restivo | ....................... | E04G 5/14 |
| 11,608,649 B2* | 3/2023 | Hammond | .............. | E04G 5/001 |
| 11,773,606 B2* | 10/2023 | Phan | ......................... | E04G 5/14 |
| | | | | 182/20 |
| 2003/0020253 A1* | 1/2003 | Albert Bosman | ...... | B60R 3/005 |
| | | | | 280/164.1 |
| 2006/0054392 A1* | 3/2006 | MacDonald | ............ | B66F 11/04 |
| | | | | 182/113 |
| 2013/0119651 A1* | 5/2013 | Conny | .................... | B60R 3/005 |
| | | | | 248/214 |
| 2015/0034418 A1* | 2/2015 | Melton | ................... | B66F 11/04 |
| | | | | 182/113 |
| 2018/0272951 A1* | 9/2018 | Oliver | ..................... | B60R 3/005 |
| 2019/0135185 A1* | 5/2019 | Oliver | ..................... | B60R 3/005 |
| 2019/0360219 A1* | 11/2019 | O'Keefe | ................... | E04G 3/28 |
| 2020/0165828 A1* | 5/2020 | Phan | ...................... | E04G 21/3228 |
| 2021/0017774 A1* | 1/2021 | Phan | ...................... | E04G 21/3228 |
| 2021/0087823 A1* | 3/2021 | Stawski | ............... | E04F 11/1865 |
| 2021/0156152 A1* | 5/2021 | Restivo | ................... | E04F 11/18 |

FOREIGN PATENT DOCUMENTS

| | | | | | |
|---|---|---|---|---|---|
| CN | 111216871 A | * | 6/2020 | .......... | B64C 1/1423 |
| CN | 111395722 A | * | 7/2020 | .............. | E04G 1/15 |
| CN | 111498765 A | * | 8/2020 | | |
| CN | 112210393 A | * | 1/2021 | ............ | C10B 41/00 |
| CN | 114772515 A | * | 7/2022 | | |
| CN | 115419318 A | * | 12/2022 | | |
| CN | 116464333 A | * | 7/2023 | | |
| CN | 116905780 A | * | 10/2023 | | |
| EP | 2572759 A1 | * | 3/2013 | ............ | A62B 99/00 |
| FR | 2980512 A1 | * | 3/2013 | ............ | E06B 11/00 |
| KR | 20140068451 A | * | 6/2014 | | |
| KR | 1020140068451 A | | 6/2014 | | |
| KR | 20190017837 A | * | 2/2019 | | |
| KR | 1020190017837 A | | 2/2019 | | |

* cited by examiner

INBOARD-MOUNTED SAFETY LATCH MECHANISM FOR PREVENTING A WALKWAY PLATFORM FLIP DOOR FROM BEING RAISED WITHOUT A GUARDRAIL INSTALLED

FIELD

The present disclosure generally relates to systems and methods involving adjustable walkway platforms and guardrails, and more particularly, to preventing an adjustable walkway platform flip door from being raised without having a guardrail installed.

BACKGROUND

During their manufacture in an airplane production facility, aircraft move along the production line between different stages of assembly. This periodic (e.g., daily) movement is called "pulsing" the production line.

In some stages of assembly, personnel may access elevated portions of the aircraft by way of fixed deck platforms positioned within a few feet from the respective sides of the aircraft's fuselage. In such scenarios, movable deck platforms (e.g., flip doors) may be coupled to the fixed deck platforms and may be operable to provide personnel with the remaining platform access up to the body of the aircraft.

Prior to pulsing the production line, the movable deck platforms may be manually rotated (e.g., raised upward or lowered downward away from the fuselage) so as to provide sufficient clearance for airplane movement along the production line. To avoid falls from the fixed deck platform at this stage, removable guardrails can be manually installed near the end of the fixed deck platform.

Once a new airplane is in a proper position along the production line, the guardrails may be manually removed and the movable deck platform could be reinstalled or rotated to a horizontal position to once again close the gap between the fixed deck platform and the aircraft fuselage and provide standing access for personnel immediately next to the fuselage.

Existing designs for movable deck platforms typically rely on manual installation of guardrails or other forms of fall protection around the deck platforms after the deck platforms have been raised. However, with such designs, personnel often forget to install the guardrails, which can put the personnel at risk of falling. Thus, a safer alternative design is desired.

SUMMARY

In an example, a system for preventing a flip door from being raised without a guardrail installed is described. The system comprises a guardrail comprising a post, the post having a post dog. The system also comprises a latch eye configured to be coupled to a flip door. The system also comprises a safety latch mechanism configured to be coupled to a fixed structure. The safety latch mechanism comprises a body, a socket configured to receive the post, and a door latch rotatably coupled to the body and biased in a latched position that is configured to engage with the latch eye and thereby retain the flip door in a lowered position. Based on the post being inserted into the socket of the safety latch mechanism, the post dog engages with and rotates the door latch from the latched position to an unlatched position, thereby allowing the flip door to be raised from the lowered position to a raised position.

In another example, another system for preventing a flip door from being raised without a guardrail installed is described. The system comprises a guardrail comprising two posts, each post having a respective post dog. The system also comprises two latch eyes configured to be coupled to a flip door. The system also comprises two safety latch mechanisms configured to be coupled to a fixed structure on opposing sides of the flip door. Each safety latch mechanism comprises a body, a socket configured to receive the post, and a door latch rotatably coupled to the body and biased in a latched position that is configured to engage with a corresponding latch eye of the two latch eyes and thereby retain the flip door in a lowered position. Based on the respective post being inserted into the socket of the safety latch mechanism, the respective post dog engages with and rotates the door latch from the latched position to an unlatched position, thereby allowing the flip door to be raised from the lowered position to a raised position.

In another example, a method is described. The method comprises positioning each of two posts of a guardrail proximate to a respective socket disposed in a respective one of two safety latch mechanisms coupled to a fixed structure on opposing sides of a flip door, each post having a respective post dog and each safety latch mechanism comprising a respective body having the respective socket, a respective door latch rotatably coupled to the body and biased in a latched position that is configured to engage with a corresponding latch eye of two latch eyes coupled to the flip door and thereby retain the flip door in a lowered position, and a respective post latch that is rotatably coupled to the body, biased in a locked position, and retained in an unlocked position based on the flip door being in the lowered position and the corresponding latch eye engaging the post latch. The method also comprises inserting each respective post of the two posts into the respective socket such that the respective post dog engages with and rotates the respective door latch from the latched position to an unlatched position, thereby allowing the flip door to be raised from the lowered position to a raised position. The method also comprises raising the flip door from the lowered position to the raised position, thereby disengaging the corresponding latch eye from the respective post latch, whereupon the respective post latch rotates from the unlocked position, toward the respective post, to the locked position, whereupon the respective post latch engages with the respective post and retains the respective post in the safety latch mechanism.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

By the terms "substantially," "about," "approximately," and "proximate" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Unless otherwise specifically noted, elements depicted in the drawings are not necessarily drawn to scale.

Within examples, described herein is a safety latch mechanism for preventing a movable deck platform (e.g., a flip door) from being raised without a guardrail (or guardrails) installed. To facilitate this, a latch eye is coupled to the flip door, and the safety latch mechanism includes a body, a socket for receiving a post of the guardrail, and a door latch rotatably coupled to the body and biased (e.g., spring biased) in a latched position that is configured to engage with the latch eye and thereby retain the flip door in a lowered position. When the post of the guardrail is then inserted into the socket, a post dog of the post engages with the door latch and rotates the door latch to an unlatched position, thus disengaging the door latch from the latch eye and allowing the flip door to be raised. Within examples, the safety latch mechanism can be installed on a fixed structure in an inboard fashion (e.g., coupled to an interior of the fixed structure to which the flip door is coupled, such that the safety latch mechanism occupies a portion of the space underneath the fixed structure).

The safety latch mechanism can also include a post latch that is biased in a locked position. In such an arrangement, the latch eye is configured to engage with and retain the post latch in an unlocked position based on the flip door being in the lowered position. Thus, when the post being inserted into the socket of the safety latch mechanism and the flip door is raised to the raised position, the latch eye disengages from the post latch, thereby causing the post latch to rotate from the unlocked position, toward the post, to the locked position, whereupon the post latch engages with the post and retains the post in the safety latch mechanism.

With the arrangement described above, safety is increased since the flip door cannot be raised until a protective guardrail is installed.

These and other improvements are described in more detail below. Implementations described below are for purposes of example. The implementations described below, as well as other implementations, may provide other improvements as well.

Figure 1:
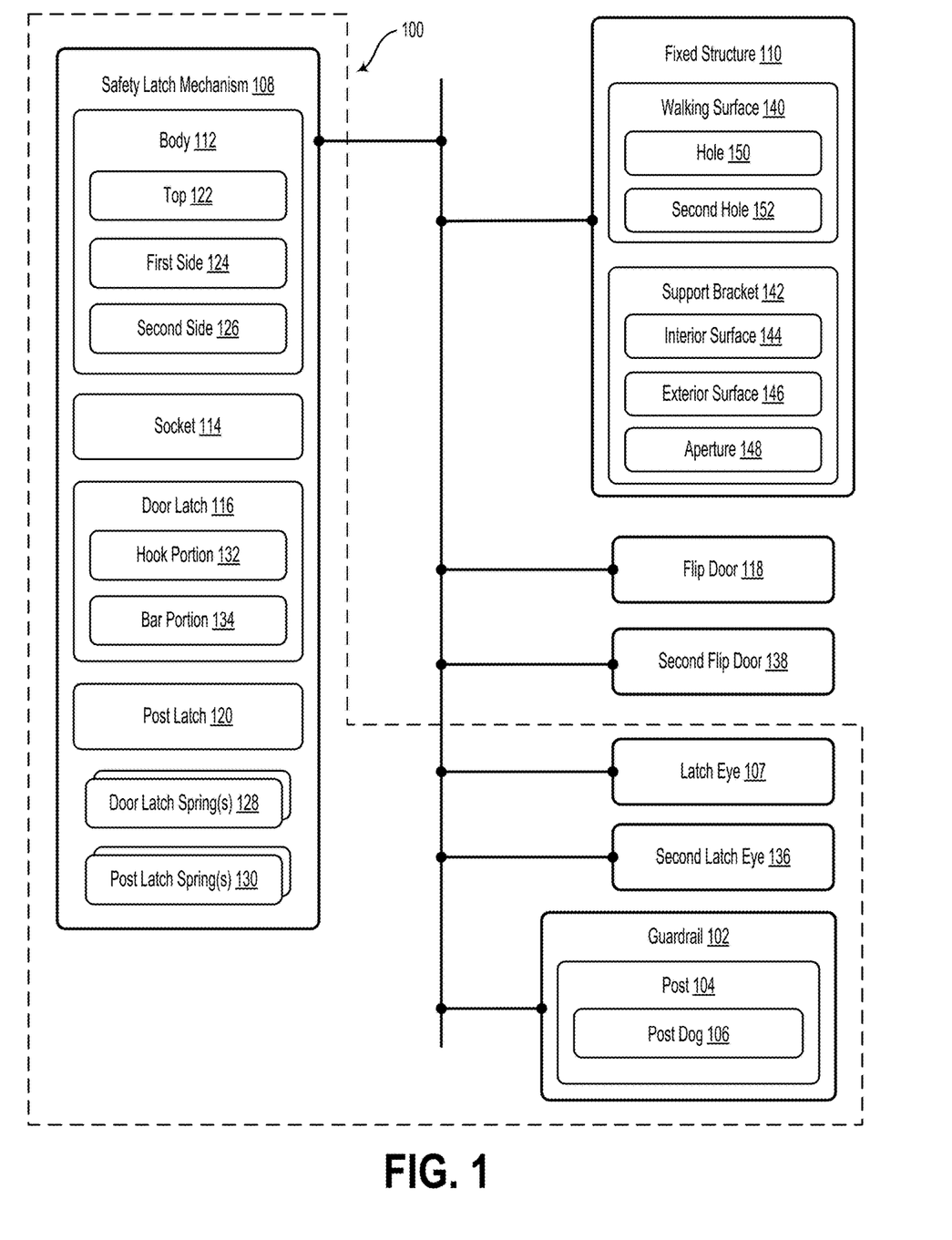
FIG. 1 depicts a system, according to an example implementation.

Referring now to the figures, FIG. 1 illustrates a system 100, according to an example implementation. The various elements of system 100 could be formed from one or more materials such as aluminum, steel, plastic, and/or another material. Furthermore, it will be understood that such elements could additionally or alternatively be formed from machined parts.

The system 100 includes a guardrail 102, which includes a post 104 having a post dog 106. In some embodiments, the guardrail 102 can include other parts as well that are not explicitly shown in FIG. 1, such as at least one rail (e.g., a top rail and a base rail, or a top rail and one or more extending rails perpendicular to the top rail) and at least one additional post. In such scenarios, the post 104 and the at least one additional post could be coupled to the top rail and the base rail.

The system 100 also includes a latch eye 107 that is configured to be coupled to a flip door 118. The latch eye 107 can be coupled to the flip door 118 by way of one or more fasteners (e.g., screws, bolts, etc.), welding, or another manner.

The system 100 also includes a safety latch mechanism 108 configured to be coupled to a fixed structure 110. For example, the safety latch mechanism 108 can be coupled to the fixed structure 110 by way of one or more fasteners. The fixed structure 110 can be a deck structure having one or more deck platforms on which personnel can walk and stand.

The safety latch mechanism 108 includes a body 112, a socket 114 disposed in the body 112 and configured to receive the post 104, and a door latch 116. The door latch 116 is rotatably coupled to the body 112 and biased in a latched position that is configured to engage with the latch eye 107 and thereby retain the flip door 118 in a lowered position.

As described herein, elements that are "rotatably coupled" to one another could be coupled by way of a pin, a rotary bearing, or at least one rotary bushing and a stripper bolt. Other types of flexible and/or adjustable couplings are contemplated to join the relevant elements in a rotatable/pivotable fashion. For example, it will be understood that other types of rotatable couplings are contemplated herein. Without limitation, elements of the system 100 could be rotatably coupled to one another by way of a straight or articulated axle, a clevis pin, a plain bearing (e.g., sleeve bearing/bushing), a ball bearing, or roller bearing, among other possibilities.

The flip door 118 can be rotatably coupled to the fixed structure 110 such that the flip door 118 can rotate between the lowered position and a raised position. To unlatch the door latch 116 and thus allow the flip door 118 to be raised from the lowered position to the raised position, the guardrail 102 is inserted into the safety latch mechanism 108. In particular, based on the post 104 being inserted into the socket 114 of the safety latch mechanism 108, the post dog 106 engages with and rotates the door latch 116 from the latched position to an unlatched position, thereby allowing the flip door 118 to be raised from the lowered position to the raised position.

In some embodiments, the safety latch mechanism 108 also includes a post latch 120 rotatably coupled to the body 112 and biased in a locked position. In such a scenario, the latch eye 107 is configured to engage with and retain the post latch 120 in an unlocked position based on the flip door 118 being in the lowered position.

The post latch 120 and can also be involved in helping promote engagement between the guardrail 102 and the safety latch mechanism 108. In particular, based on the post 104 being inserted into the socket 114 of the safety latch mechanism 108 and the flip door 118 being raised to the raised position, the latch eye 107 is configured to disengage from the post latch 120, thereby causing the post latch 120 to rotate from the unlocked position, toward the post 104, to the locked position, whereupon the post latch 120 engages with the post 104 and retains the post 104 in the safety latch mechanism 108. For instance, a top portion of the post latch 120, when rotated forward, can rest on top of the top of the post dog 106, preventing upward movement of the post dog 106, and thus the post 104, out of the socket 114.

Additionally, the post latch 120 can be involved in disengaging the guardrail 102 from the safety latch mechanism 108. In particular, based on the flip door 118 being lowered from the raised position to the lowered position, the latch eye 107 is configured to engage with (e.g., push) the post latch 120, causing the post latch 120 to rotate from the locked position to the unlocked position and disengage from the post 104, thereby allowing the post 104 to be removed from the socket 114. Further, based on the post 104 being removed from the socket 114, the door latch 116 rotates from the unlatched position to the latched position, thereby engaging with (e.g., hooking onto) the latch eye 107 and retaining the flip door 118 in the lowered position.

In some embodiments, the post latch 120 is rotatably coupled to the door latch 116 such that the post latch 120 rotates relative to, and independent from, the door latch 116. For example, the post latch 120 and the door latch 116 can both be coupled to the body 112 of the safety latch mechanism 108 via an axle such that both the post latch 120 and the door latch 116 rotate independently about the axle.

In some embodiments, the body 112 of the safety latch mechanism 108 has a top 122, a first side 124, and a second side 126. In such a scenario, the door latch 116 can be rotatably coupled to at least one side of the body 112 (e.g., the first side 124) and can be biased in the latched position via at least one door latch spring 128 (e.g., a pair of springs) that is coupled between the door latch 116 and the at least one side of the body 112 coupled between the first side 124 and the door latch 116). Further, the post latch 120 can be rotatably coupled to the at least one side of the body 112 and can be biased in the locked position via at least one post latch spring 130 (e.g., a pair of springs) that is coupled between the post latch 120 and the top 122 of the body 112. In alternative embodiments, the door latch 116 and/or the post latch 120 can be biased by way of some other mechanism, other than a spring.

In some embodiments, the door latch 116 includes a hook portion 132 and a bar portion 134. For instance, the hook portion 132 can make up one end of the door latch 116, and the bar portion 134 can make up the opposite end of the door latch 116. In such a scenario, based on the door latch 116 being in the latched position, the hook portion 132 hooks onto the latch eye 107 and retains the flip door 118 in the lowered position. Further, based on the post 104 being inserted into the socket 114 of the safety latch mechanism 108 and the flip door 118 being raised to the raised position, the post dog 106 pushes the bar portion 134 downward, thereby causing the door latch 116 to rotate, whereupon the hook portion 132 unhooks from the latch eye 107 and allows the flip door 118 to be raised from the lowered position to the raised position.

In some embodiments, the system 100 also includes a second latch eye 136 configured to be coupled to a second flip door 138 that is adjacent to the flip door 118. The second flip door 138 can be configured similarly to the flip door 118, and can thus be rotatably coupled to the fixed structure 110 such that the second flip door 138 can rotate between the lowered position and the raised position. In such a scenario, based on the door latch 116 being in the latched position, the door latch 116 also engages with (e.g., hooks onto) the second latch eye 136, thereby retaining the second flip door 138 in the lowered position. To facilitate this, for instance, the hook portion 132 of the door latch 116 can include two hooks, one proximate to the first side 124 of the body 112 and another proximate to the second side 126 of the body 112. Further, based on the post 104 being inserted into the socket 114 of the safety latch mechanism 108, the post dog 106 engages with and rotates the door latch 116 from the latched position to the unlatched position, thereby allowing the second flip door 138 to be raised from the lowered position to the raised position.

In some embodiments, alternatively to having the safety latch mechanism 108 engage with latch eyes on two separate flip doors and retain the two separate flip doors in the lowered position, the door latch 116 of the safety latch mechanism 108 can be configured to engage with and multiple latch eyes on a single flip door (e.g., the flip door 118). For instance, the second latch eye 136 can be configured to be coupled to the flip door 118.

In some embodiments, the fixed structure 110 has a walking surface 140 and a support bracket 142. The support bracket 142 has an interior surface 144 facing a space underneath the walking surface 140, as well as an exterior surface 146 that is opposite the interior surface 144 and that faces away from the space underneath the walking surface 140. The support bracket 142 also includes an aperture 148 configured to receive the latch eye 107 based on the flip door 118 being in the lowered position. In such a scenario, the safety latch mechanism 108 is coupled to the interior surface 144 of the support bracket 142. That is, the safety latch mechanism 108 is inboard-facing and disposed within the space underneath the walking surface 140. Further, in such a scenario, the system 100 can also include the flip door 118 and the fixed structure 110.

In some embodiments, the walking surface 140 includes a hole 150 that is substantially aligned with the socket 114 and configured to receive the post 104. Further, in embodiments in which the guardrail 102 includes a second post (not shown in FIG. 1), the walking surface 140 can have a pair of holes, including the hole 150 as well as a second hole 152 that is substantially aligned with a socket of another safety latch mechanism (not shown), or a second socket (not shown) of the safety latch mechanism 108, and that is configured to receive the second post.

Figure 2:
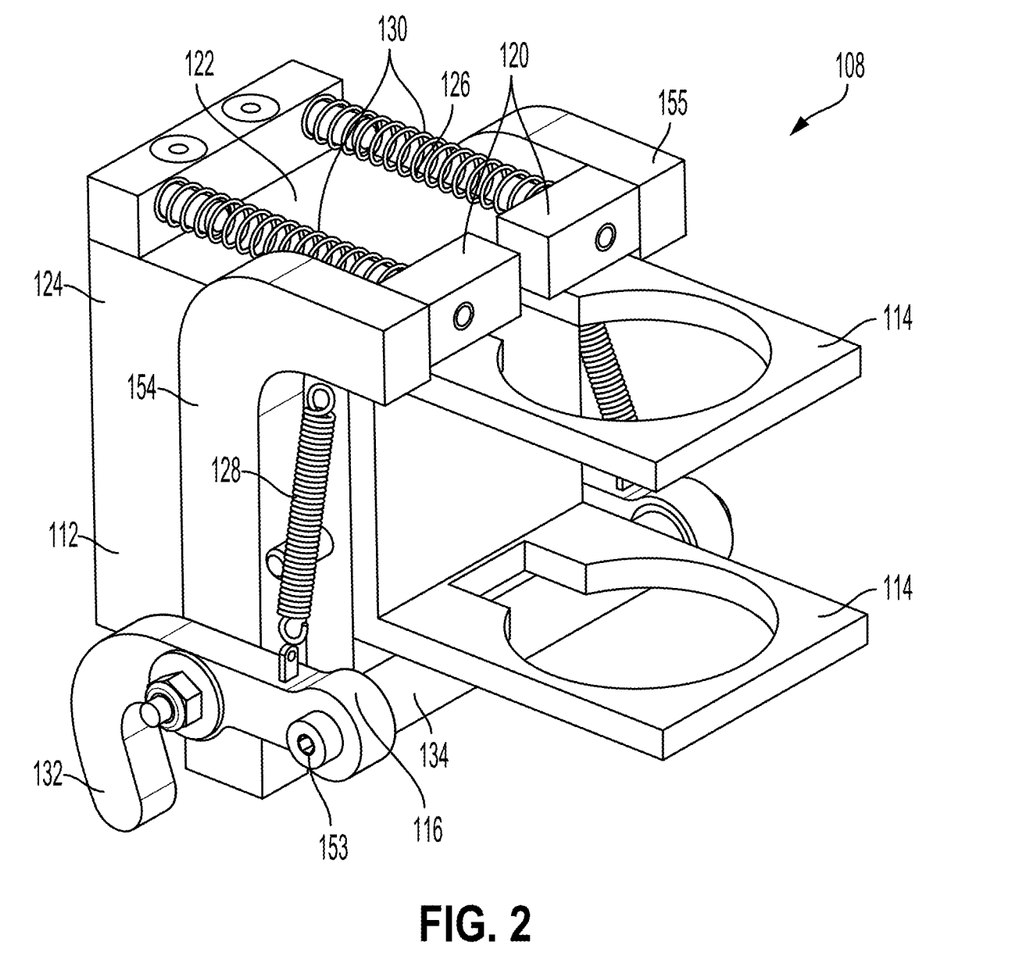
FIG. 2 depicts the safety latch mechanism of FIG. 1, according to an example implementation.

FIG. 2 depicts the safety latch mechanism 108 of the system 100, according to an example implementation. As shown, the socket 114 extends from the body 112 such that the socket 114 receives the post 104 (not shown) adjacent to the body 112. More particularly, the socket 114 is made up of two members that each protrude from the body 112 and that each include a circular or other shaped opening disposed therein and substantially aligned with each other opening. Each opening can be shaped according to a shape selected for the post 104 and the post dog 106, both of which are not explicitly shown in FIG. 2. Other quantities of members and other shapes are possible as well.

As further shown, the door latch 116 and the post latch 120 are rotatably coupled to each other, and rotatably coupled to the second side 126 of the body 112, by way of a bolt 153. Although not explicitly shown in FIG. 2, the door latch 116 and the post latch 120 can be rotatably coupled to each other and to the first side 124 of the body 112 by way of the bolt 153 or a separate bolt. The bolt 153 defines an axis of rotation that is substantially perpendicular to the body 112.

As yet further shown, the at least one door latch spring 128 is coupled to the door latch 116 on the second side 126 of the body 112, and the at least one post latch spring 130 is coupled to the post latch 120 on a top 122 of the body 112. Although not explicitly shown in FIG. 2, a second spring of the at least one door latch spring 128 can be coupled to the door latch 116 on the first side 124 of the body 112. Furthermore, the post latch 120 is shown in the locked position, although in a scenario in which the flip door 118 (not shown) is in the lowered positon, the latch eye 107 (not shown) would be retaining the post latch 120 in the unlocked position.

In various examples illustrated herein, the post latch 120 is shown to include a first post latch arm 154 that is rotatably coupled to the first side 124 and a second post latch arm 155 that is rotatably coupled to the second side 126. Further, the first post latch arm 154 and the second post latch arm 155 are each attached to the top 122 of the body 112 by way of a respective spring, and the first post latch arm 154 and the second post latch arm 155 are each independently rotatable relative to the other. Additionally, with this arrangement, each of the two post latch arms are configured to be retained in the unlocked position by a corresponding latch eye, independently from one another, as well as to be rotatable to the locked position via disengagement with the corresponding latch eye, independently from one another. For example, the first post latch arm 154 retained by the latch eye 107, and the second post latch arm 155 is retained by the second latch eye 136. As such, the post 104 (not shown) might not be able to be removed from the socket 114 until two adjacent flip doors are in the lowered position, thus causing both post latch arms to be in the unlocked position.

Figure 3:
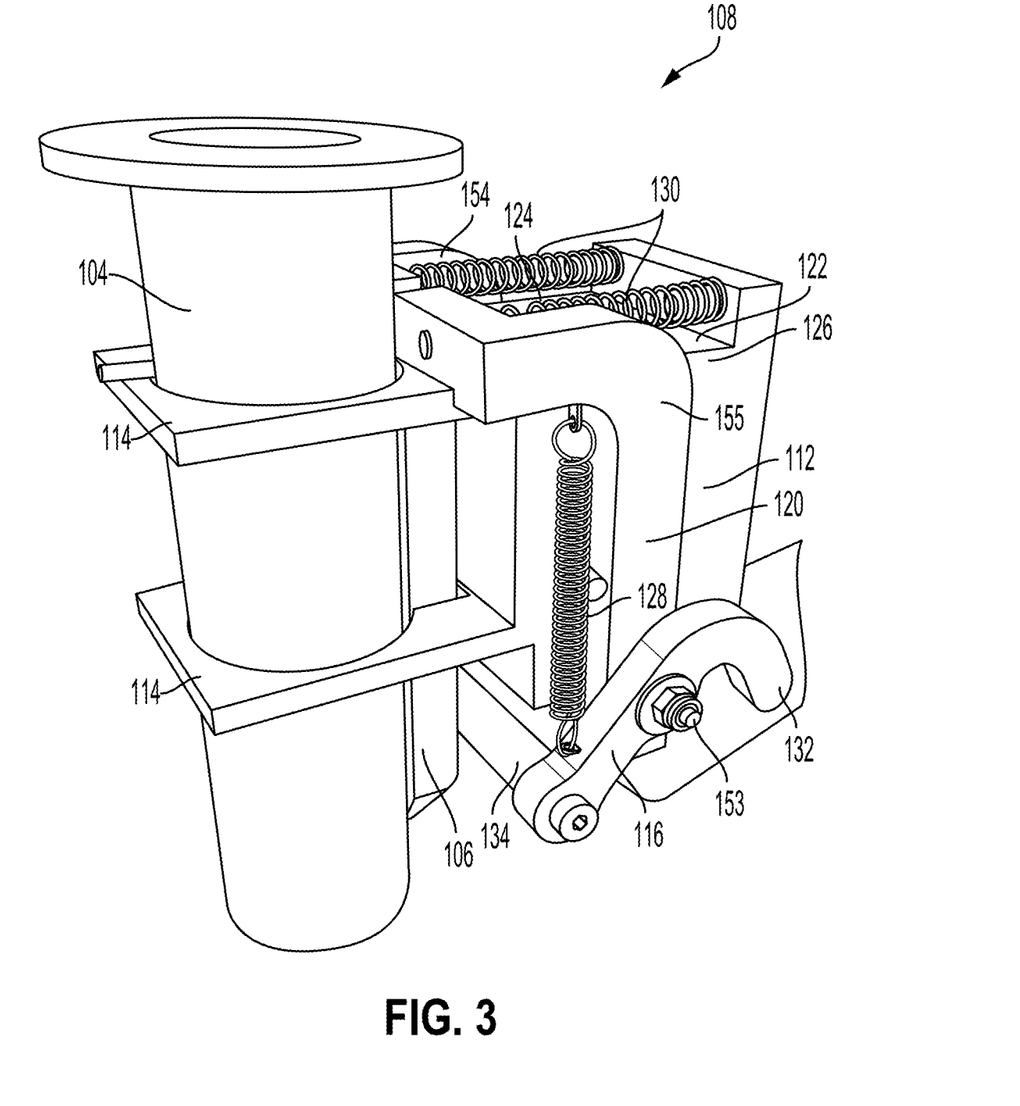
FIG. 3 depicts the safety latch mechanism of FIG. 1, as well as a portion of the guardrail of FIG. 1, according to an example implementation.

FIG. 3 depicts an operating scenario in which the post 104 is inserted into the socket 114 of the safety latch mechanism 108. For illustrative purposes, a portion of the post 104 is shown-namely, a bottom portion that includes the post dog 106. As shown, with the post 104 inserted, the post dog 106 has pushed the bar portion 134 of the door latch 116 downwards, thus rotating the hook portion 132 of the door latch 116 upwards. As further shown, the post latch 120 is in the locked position above the post dog 106, thus retaining the post 104 in the socket 114.

Figure 4:
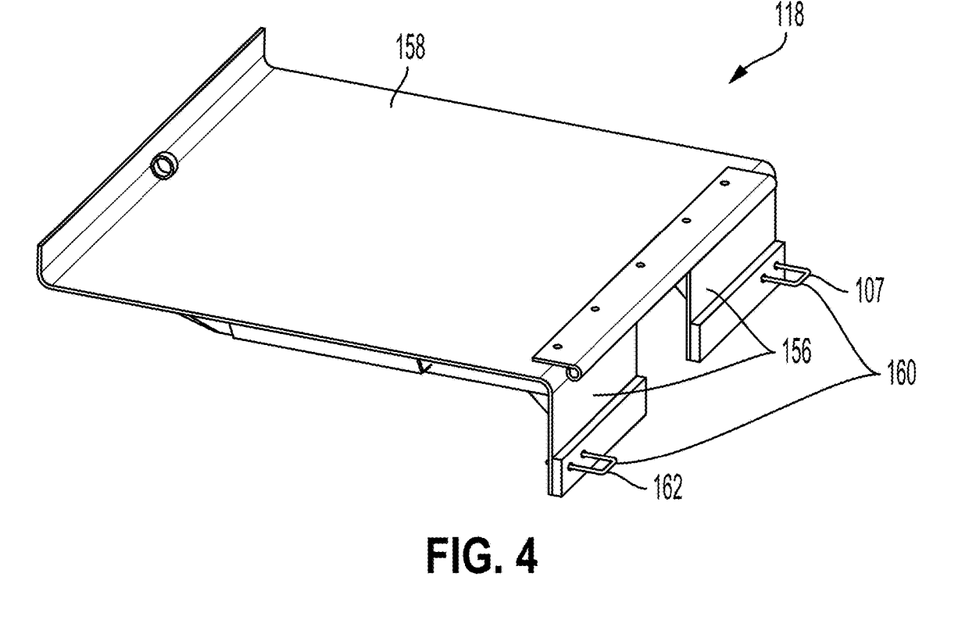
FIG. 4 depicts a flip door, according to an example implementation.

FIG. 4 depicts the flip door 118, which includes a strike flange portion 156 and a walking portion 158. As shown, two latch eyes 160 are coupled to the flip door 118. The two latch eyes 160 include the latch eye 107 of the system 100, which is coupled to one of two strike flanges that make up the strike flange portion 156, and another latch eye 162 (different from the second latch eye 136, which is not shown in FIG. 4 and would be coupled to the second flip door 138) is attached to another of the two strike flanges. In particular, the two latch eyes 160 are coupled to surfaces of the strike flanges such that, when the flip door 118 is rotatably coupled to the fixed structure 110 (not shown in FIG. 4), face and are adjacent to (or contact) the exterior surface 146 (not shown) of the support bracket 142 (not shown). Further, based on the flip door 118 being in the lowered position, the two latch eyes 160 would protrude through corresponding apertures in the support bracket 142 (not shown).

FIGS. 5-13 depict various operating scenarios involving the system 100, as illustrated and described in reference to FIG. 1. For clarity, only a subset of the total structures of the system 100 are specifically numbered in FIGS. 5-13.

Figure 5:
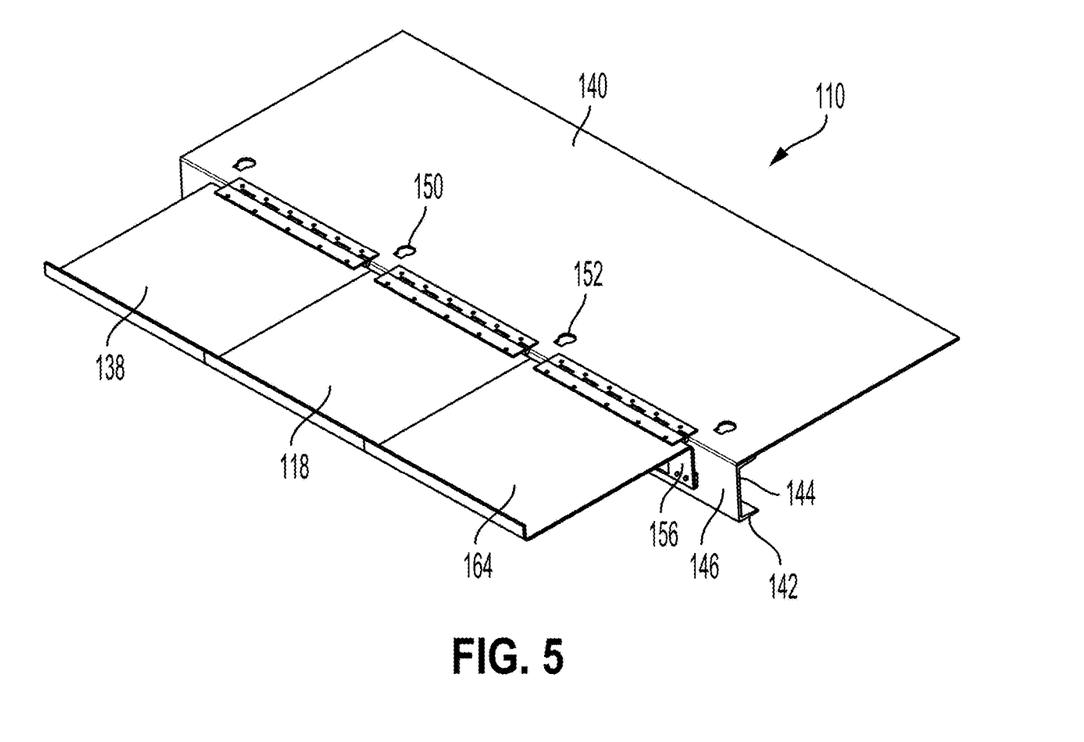
FIG. 5 depicts an operating scenario involving the system of FIG. 1, according to an example implementation.

FIG. 5 depicts an operating scenario in which a plurality of flip doors are in the lowered position. As shown, the plurality of flip doors include the flip door 118 and two other flip doors that are adjacent to the flip door 118—namely, the second flip door 138 and a third flip door 164. Four holes are shown in the walking surface 140, including the hole 150 and the second hole 152. In the lowered position, the flip doors extend substantially parallel along a reference plane that is parallel to the walking surface 140 of the fixed structure 110.

Although not explicitly shown, a plurality of safety latch mechanisms can be attached to the interior surface 144 of the support bracket 142, each having a respective socket that substantially aligns with each of the holes.

As further shown, each of the other two flip doors are shown to be configured similarly to the flip door 118, each with a respective strike flange portion and a respective walking portion. The strike flange portion of the third flip door 164, also denoted as strike flange portion 156, is shown to be pressed up against the exterior surface 146 of the support bracket 142.

Figure 6:
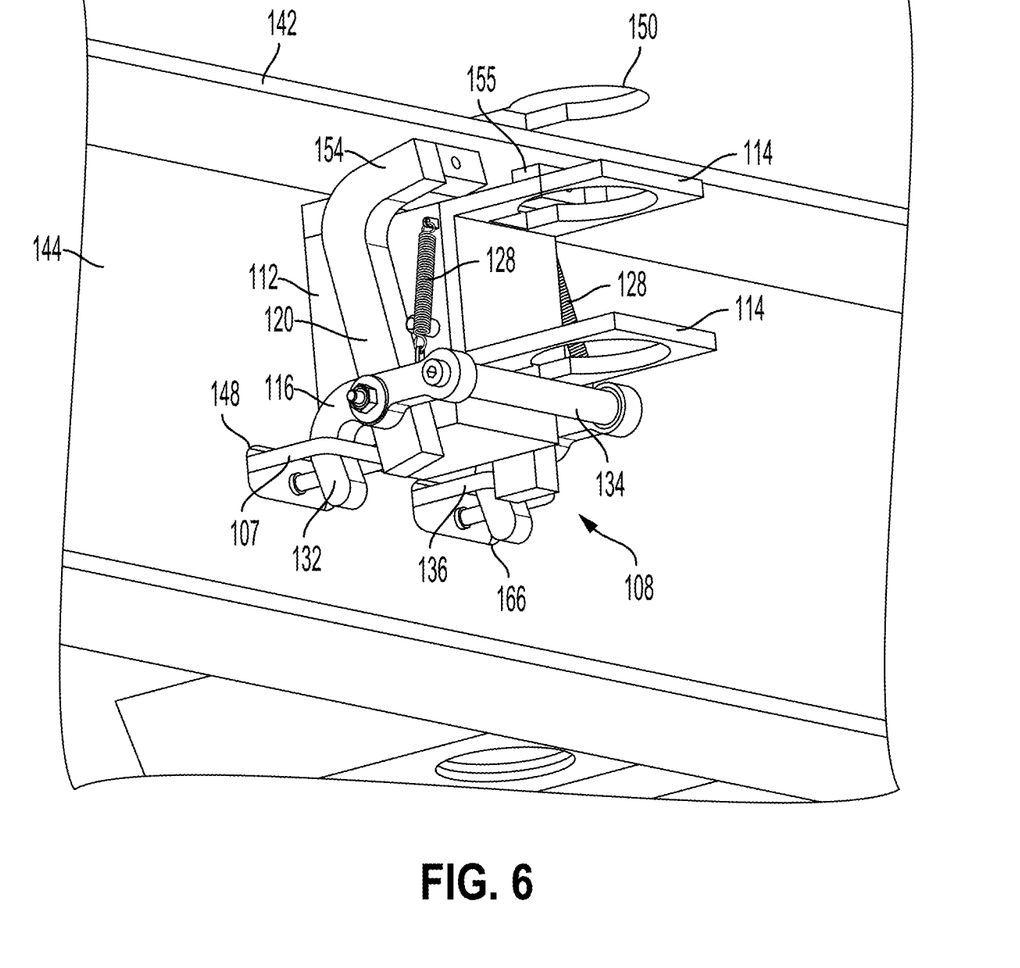
FIG. 6 depicts an operating scenario involving the system of FIG. 1, according to an example implementation.

FIG. 6 depicts another view of the operating scenario in which the flip door 118 (not shown) is in the lowered position. As shown, the latch eye 107 (which is coupled to the flip door 118) and the second latch eye 136 (which is coupled to the second flip door 138 (not shown)) are both retained by way of the hook portion 132 of the door latch 116, and thus the flip door 118 is retained in the lowered position. As further shown, the latch eye 107 protrudes through the aperture 148 in the support bracket 142 and the second latch eye 136 protrudes through another aperture 166 in the support bracket 142. Both latch eyes thus push up against a bottom portion the post latch 120 and retain the post latch 120 in the unlocked position.

Figure 7:
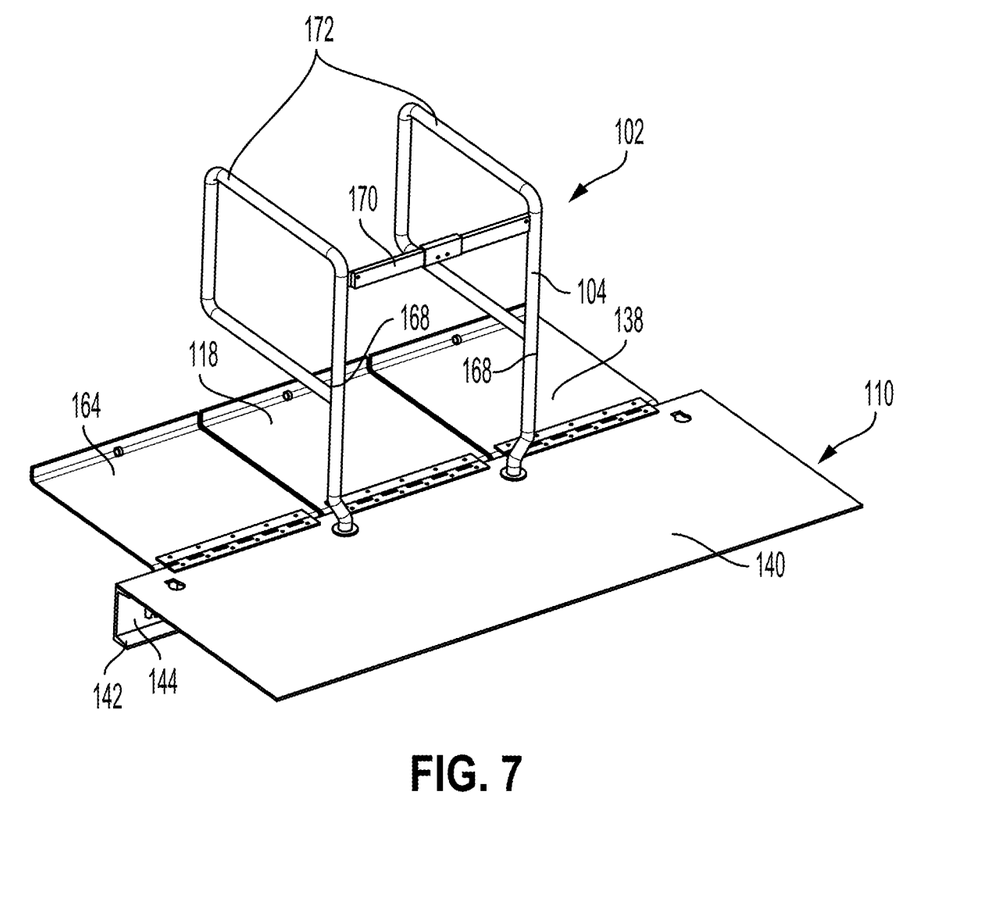
FIG. 7 depicts an operating scenario involving the system of FIG. 1, according to an example implementation.

FIG. 7 depicts an operating scenario in which the flip door 118, the second flip door 138, and the third flip door 164 are in the lowered position and two posts 168 of the guardrail 102, including the post 104, are inserted into the respective sockets of two safety latch mechanisms (not shown). As shown, the guardrail 102 also includes a foldable top rail 170, as well as two extending rails 172 that are perpendicular to the foldable top rail 170. Some embodiments of the guardrail 102 can be foldable for storage purposes, and can be unfolded before insertion into sockets of safety latch mechanisms. In alternative embodiments, the guardrail 102 can include only a single post, configured in the same way or a similar way as the post 104 described above.

Figure 8:
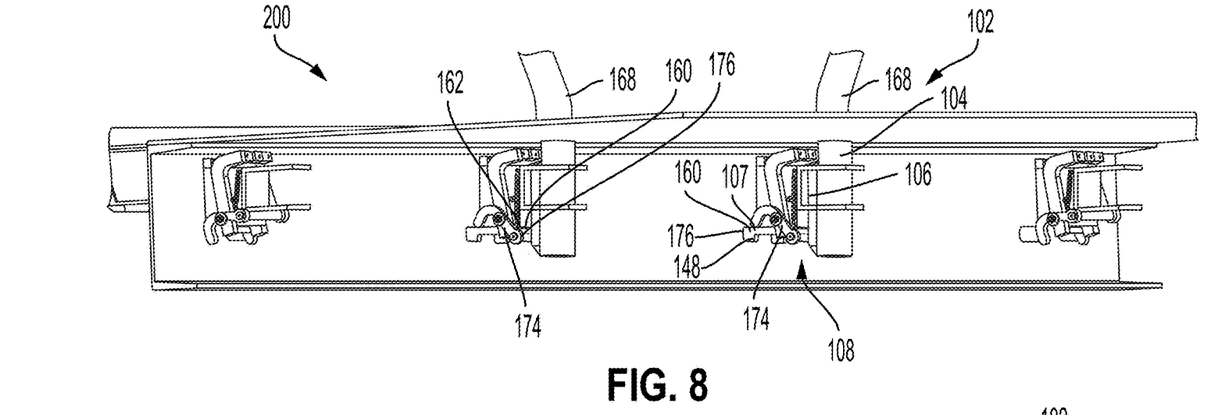
FIG. 8 depicts an operating scenario involving the system of FIG. 1, according to an example implementation.

FIG. 8 depicts another view of the operating scenario in which the two posts 168 of the guardrail 102 are inserted into the respective sockets of the two safety latch mechanisms 174. In example embodiments, another system 200 can include the guardrail 102 having the two posts 168, of which the post 104 is representative, and can also include the two safety latch mechanisms 174, of which the safety latch mechanism 108 of system 100 is representative. The other system 200 can also include the two latch eyes 160, including the latch eye 107 and the other latch eye 162. As shown, the two latch eyes 160 protrude through a pair of apertures 176, of which the aperture 148 is representative.

The two safety latch mechanisms 174 are each shown with two respective door latches in the unlatched position, although since the flip door 118, the second flip door 138, and the third flip door 164 are in the lowered position, the respective post latches of those flip doors are still retained in the unlocked position (e.g., the two latch eyes 160 are pushing against the two door latches). Because the door latches are each in the unlatched position, the two latch eyes 160 are clear to move out of the pair of apertures 176 and the flip door 118 can be moved to the raised position.

Figure 9:
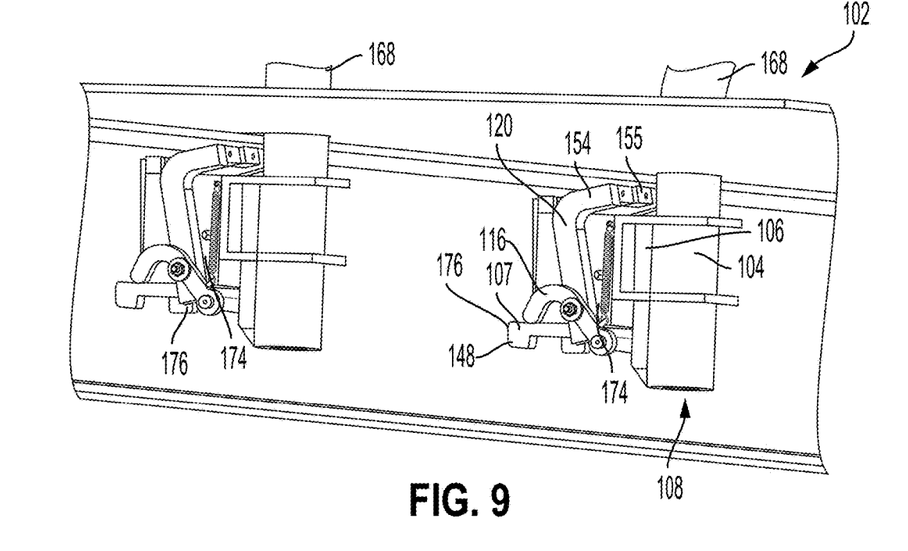
FIG. 9 depicts an operating scenario involving the system of FIG. 1, according to an example implementation.

FIG. 9 depicts a zoomed-in view of the operating scenario of FIG. 8.

Figure 10:
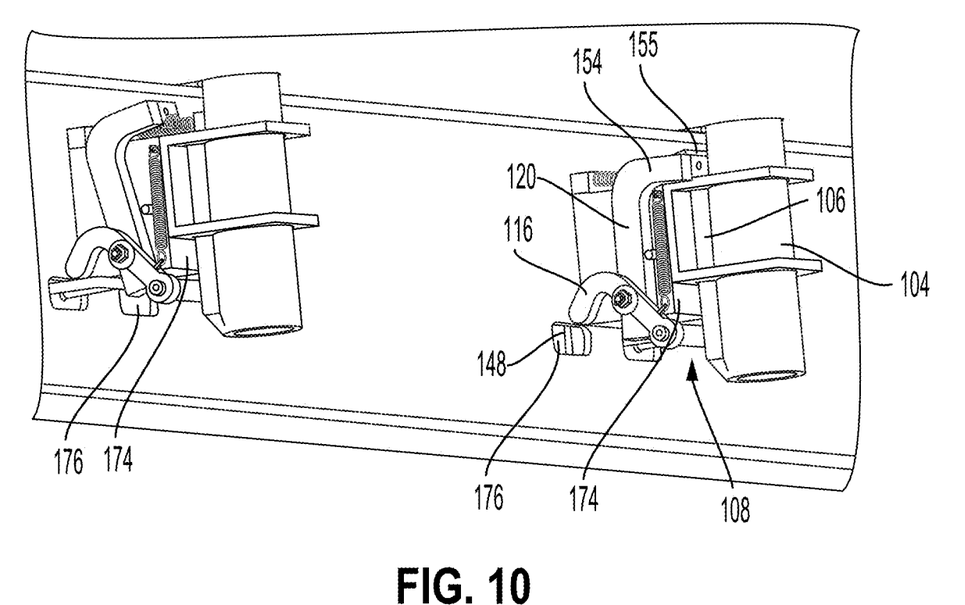
FIG. 10 depicts an operating scenario involving the system of FIG. 1, according to an example implementation.

FIG. 10 depicts an operating scenario in which the flip door 118 (not shown) has been raised to the raised position, but, as shown by the latch eyes still protruding through their respective apertures, the second flip door 138 and the third flip door 164 are not in the raised position. Based on the flip door 118 being in the raised position, the first post latch arm 154 is in the locked position, and based on the second flip door 138 being in the lowered position, the second post latch arm 155 is in the unlocked position. While the first post latch arm 154 being in the locked position can retain the post 104 in some scenarios, the second post latch arm 155 being in the locked position can add additional support in retaining the post 104.

Figure 11:
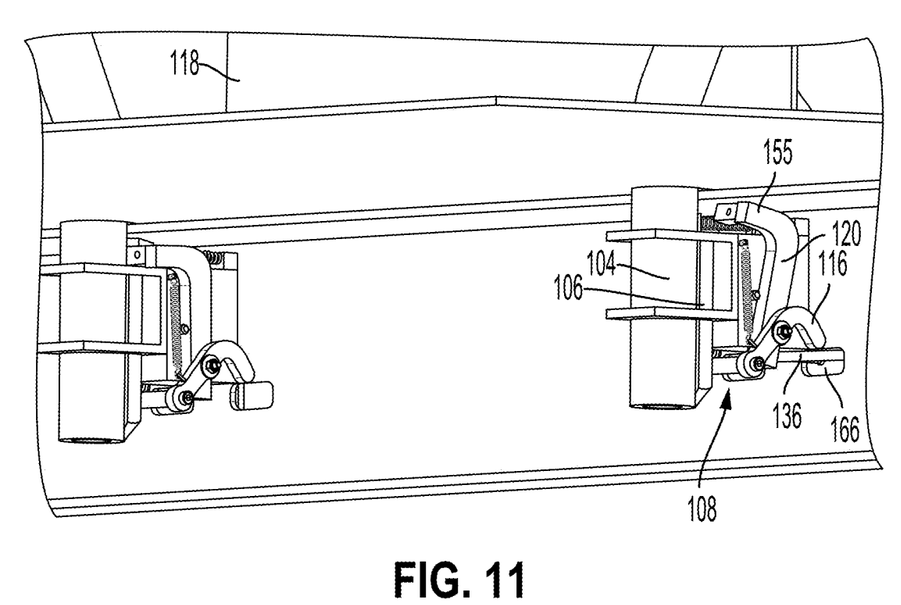
FIG. 11 depicts an operating scenario involving the system of FIG. 1, according to an example implementation.

FIG. 11 depicts another view of the operating scenario of FIG. 10, but with the flip door 118 visible.

Figure 12:
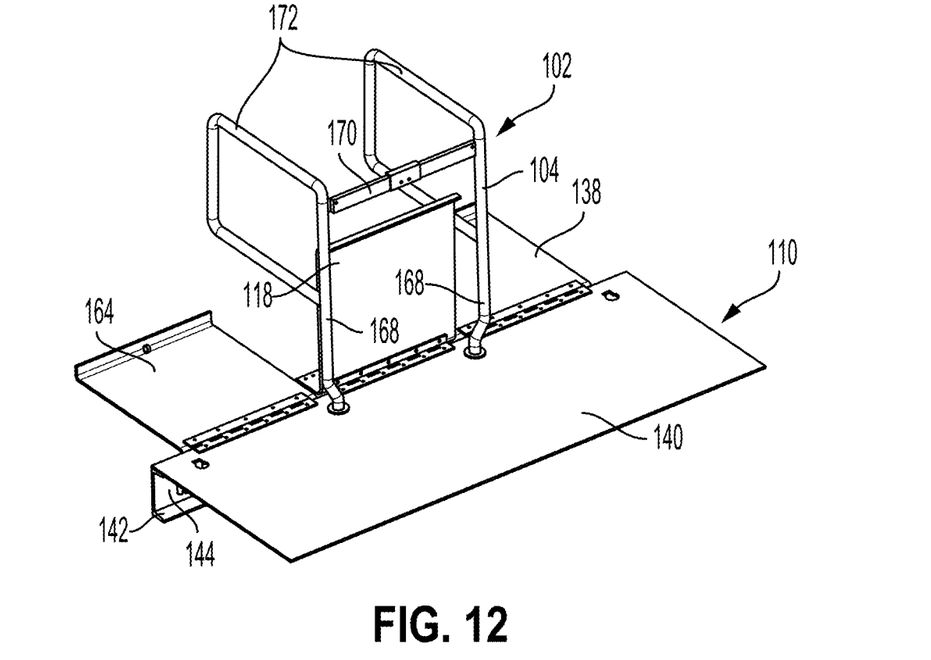
FIG. 12 depicts an operating scenario involving the system of FIG. 1, according to an example implementation.

FIG. 12 depicts another view of the operating scenario of FIG. 10, with each flip door visible.

Figure 13:
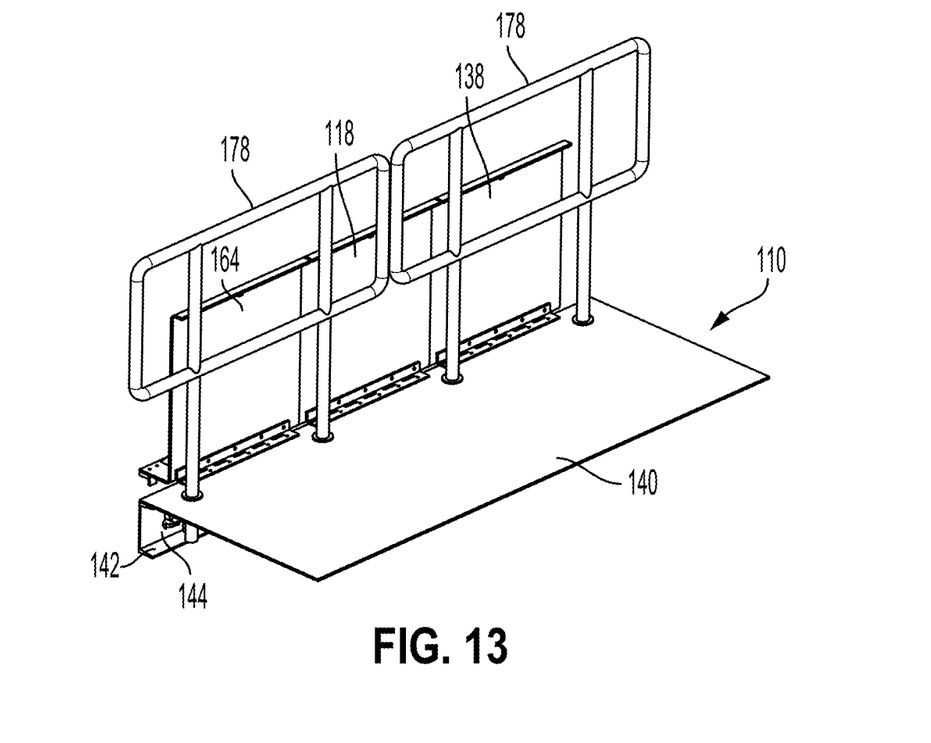
FIG. 13 depicts an operating scenario involving the system of FIG. 1, according to an example implementation.

FIG. 13 depicts an operating scenario in which, instead of the guardrail 102 being inserted into the two safety latch mechanisms 174 (not shown), a pair of guardrails 178 are inserted into the safety latch mechanisms. That is, FIG. 13 depicts a scenario in which posts from two separate guardrails can be used to raise a single flip door, as opposed to two posts from a single guardrail are used to raise a single flip door. As further shown, each of the flip doors are in the raised position.

Figure 14:
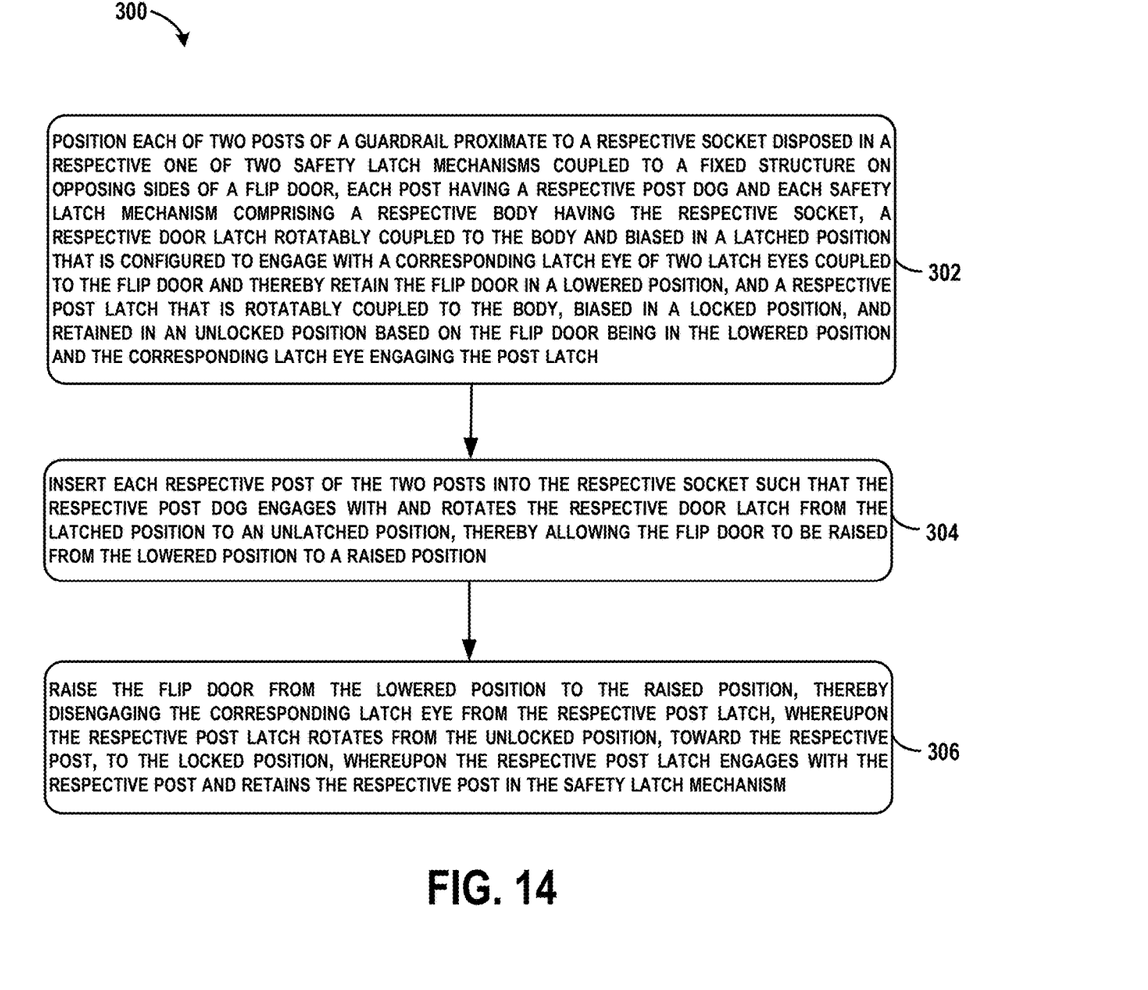
FIG. 14 shows a flowchart of an example method, according to an example implementation.

FIG. 14 shows a flowchart of an example of a method 300 that could be used with the system 100, the other system 200, and elements thereof shown in FIGS. 1-13. Method 300 may include one or more operations, functions, or actions as illustrated by one or more of blocks 302-306.

At block 302, the method 300 includes positioning each of two posts of a guardrail proximate to a respective socket disposed in a respective one of two safety latch mechanisms coupled to a fixed structure on opposing sides of a flip door, each post having a respective post dog and each safety latch mechanism comprising a respective body having the respective socket, a respective door latch rotatably coupled to the body and biased in a latched position that is configured to engage with a corresponding latch eye of two latch eyes coupled to the flip door and thereby retain the flip door in a lowered position, and a respective post latch that is rotatably coupled to the body, biased in a locked position, and retained in an unlocked position based on the flip door being in the lowered position and the corresponding latch eye engaging the post latch.

At block 304, the method 300 includes inserting each respective post of the two posts into the respective socket such that the respective post dog engages with and rotates the respective door latch from the latched position to an unlatched position, thereby allowing the flip door to be raised from the lowered position to a raised position.

At block 306, the method 300 includes raising the flip door from the lowered position to the raised position, thereby disengaging the corresponding latch eye from the respective post latch, whereupon the respective post latch rotates from the unlocked position, toward the respective post, to the locked position, whereupon the respective post latch engages with the respective post and retains the respective post in the safety latch mechanism.

Within examples, the method 300 can also include lowering the flip door from the raised position to the lowered position, thereby engaging the corresponding latch eye with the respective post latch, causing the respective post latch to rotate from the locked position to the unlocked position and disengage from the respective post, thereby allowing the respective post to be removed from the respective socket. The method 300 can also include removing each respective post of the two posts from the respective socket, thereby causing the respective door latch to rotate to the latched position, thereby engaging with the corresponding latch eye and retaining the flip door in the lowered position.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A system for preventing a flip door from being raised without a guardrail installed, the system comprising:
   a guardrail comprising a post, the post having a post dog;
   a latch eye configured to be coupled to a flip door; and
   a safety latch mechanism configured to be coupled to a fixed structure, the safety latch mechanism comprising:
   a body,
   a socket configured to receive the post, and
   a door latch rotatably coupled to the body and biased in
      a latched position that is configured to engage with
      the latch eye and thereby retain the flip door in a
      lowered position, wherein based on the post being inserted into the socket of the safety latch mechanism, the post dog engages with and rotates the door latch from the latched position to an unlatched position, thereby allowing the flip door to be raised from the lowered position to a raised position.

2. The system of claim 1, wherein:
the safety latch mechanism further comprises a post latch rotatably coupled to the body and biased in a locked position,
the latch eye is configured to engage with and retain the post latch in an unlocked position based on the flip door being in the lowered position, and
based on the post being inserted into the socket of the safety latch mechanism and the flip door being raised to the raised position, the latch eye is configured to disengage from the post latch, thereby causing the post latch to rotate from the unlocked position, toward the post, to the locked position, whereupon the post latch engages with the post and retains the post in the safety latch mechanism.

3. The system of claim 2, wherein the post latch is rotatably coupled to the door latch such that the post latch rotates relative to, and independent from, the door latch.

4. The system of claim 2, wherein:
based on the flip door being lowered from the raised position to the lowered position, the latch eye is configured to engage with the post latch, causing the post latch to rotate from the locked position to the unlocked position and disengage from the post, thereby allowing the post to be removed from the socket, and
based on the post being removed from the socket, the door latch rotates from the unlatched position to the latched position, thereby engaging with the latch eye and retaining the flip door in the lowered position.

5. The system of claim 2, wherein:
the door latch comprises a hook portion and a bar portion,
the hook portion hooks onto the latch eye and retains the flip door in the lowered position based on the door latch being in the latched position,
based on the post being inserted into the socket of the safety latch mechanism and the flip door being raised to the raised position, the post dog pushes the bar portion downward, thereby causing the door latch to rotate, whereupon the hook portion unhooks from the latch eye and allows the flip door to be raised from the lowered position to the raised position.

6. The system of claim 2, wherein the socket extends from the body such that the socket receives the post adjacent to the body.

7. The system of claim 2, wherein:
the door latch is rotatably coupled to at least one side of the body, and biased via at least one door latch spring coupled between the door latch and the at least one side, and
the post latch is rotatably coupled to the at least one side of the body, and biased via at least one post latch spring coupled between the post latch and a top of the body.

8. The system of claim 1, further comprising:
a second latch eye configured to be coupled to a second flip door that is adjacent to the flip door,
wherein:
based on the door latch being in the latched position, the door latch further engages with the second latch eye, thereby retaining the second flip door in the lowered position, and
based on the post being inserted into the socket of the safety latch mechanism, the post dog engages with and rotates the door latch from the latched position to the unlatched position, thereby allowing the second flip door to be raised from the lowered position to the raised position.

9. The system of claim 1, further comprising:
the flip door; and
the fixed structure,
wherein:
the fixed structure comprises a walking surface and a support bracket, the support bracket having an interior surface facing a space underneath the walking surface, an exterior surface, opposite the interior surface, facing away from the space, and an aperture configured to receive the latch eye,
the safety latch mechanism is coupled to the interior surface of the support bracket, and
the walking surface comprises a hole substantially aligned with the socket.

10. A system for preventing a flip door from being raised without a guardrail installed, the system comprising:
a guardrail comprising two posts, each post having a respective post dog;
two latch eyes configured to be coupled to a flip door; and
two safety latch mechanisms configured to be coupled to a fixed structure on opposing sides of the flip door, each safety latch mechanism comprising:
a body,
a socket disposed in the body and configured to receive a respective post of the two post, and
a door latch rotatably coupled to the body and biased in a latched position that is configured to engage with a corresponding latch eye of the two latch eyes and thereby retain the flip door in a lowered position,
wherein based on the respective post being inserted into the socket of the safety latch mechanism, the respective post dog engages with and rotates the door latch from the latched position to an unlatched position, thereby allowing the flip door to be raised from the lowered position to a raised position.

11. The system of claim 10, wherein:
each safety latch mechanism further comprises a post latch rotatably coupled to the body and biased in a locked position,
the post latch is configured to be retained in an unlocked position based on the flip door being in the lowered position and the corresponding latch eye engaging the post latch, and
based on the respective post being inserted into the socket of the safety latch mechanism and the flip door being raised to the raised position, the corresponding latch eye is configured to disengage from the post latch, thereby causing the post latch to rotate from the unlocked position, toward the respective post, to the locked position, whereupon the post latch engages with the respective post and retains the respective post in the safety latch mechanism.

12. The system of claim 11, wherein the post latch is rotatably coupled to the door latch such that the post latch rotates relative to, and independent from, the door latch.

13. The system of claim 11, wherein:
based on the flip door being lowered from the raised position to the lowered position, the corresponding latch eye is configured to engage with the post latch, causing the post latch to rotate from the locked position to the unlocked position and disengage from the respective post, thereby allowing the respective post to be removed from the socket, and based on the respective post being removed from the socket, the door latch rotates from the unlatched position to the latched position, thereby engaging with the corresponding latch eye and retaining the flip door in the lowered position.

14. The system of claim 11, wherein:

the door latch comprises a hook portion and a bar portion, the hook portion hooks onto the corresponding latch eye and retains the flip door in the lowered position based on the door latch being in the latched position, based on the respective post being inserted into the socket of the safety latch mechanism and the flip door being raised to the raised position, the respective post pushes the bar portion downward, thereby causing the door latch to rotate, whereupon the hook portion unhooks from the corresponding latch eye and allows the flip door to be raised from the lowered position to the raised position.

15. The system of claim 11, wherein the socket extends from the body such that the socket receives the post adjacent to the body.

16. The system of claim 11, wherein:

the door latch is rotatably coupled to at least one side of the body, and biased via at least one door latch spring coupled between the door latch and the at least one side, and the post latch is rotatably coupled to the at least one side of the body, and biased via at least one post latch spring coupled between the post latch and a top of the body.

17. The system of claim 10, wherein the door latch of at least one of the two safety latch mechanisms is further configured to engage with a second latch eye of a second flip door that is adjacent to the flip door, and thereby retain the second flip door in the lowered position.

18. The system of claim 10, further comprising:

the flip door; and the fixed structure, wherein:

the fixed structure comprises a walking surface and a support bracket, the support bracket having an interior surface facing a space underneath the walking surface, an exterior surface, opposite the interior surface, facing away from the space, and a pair of apertures configured to receive the two latch eyes, the safety latch mechanism is coupled to the interior surface of the support bracket, and the walking surface comprises a pair of holes, each substantially aligned with the socket of a respective one of the two safety latch mechanisms.

19. A method comprising the system of claim 10, the method further comprising:

positioning each of the two posts of the guardrail proximate to a respective socket disposed in a respective one of the two safety latch mechanisms coupled to the fixed structure on opposing sides of the flip door, each safety latch mechanism further comprising a respective post latch that is rotatably coupled to the body, biased in a locked position, and retained in an unlocked position based on the flip door being in the lowered position and the corresponding latch eye engaging the post latch;

inserting each respective post of the two posts into the respective socket such that the respective post dog engages with and rotates the respective door latch from the latched position to the unlatched position, thereby allowing the flip door to be raised from the lowered position to the raised position; and raising the flip door from the lowered position to the raised position, thereby disengaging the corresponding latch eye from the respective post latch, whereupon the respective post latch rotates from the unlocked position, toward the respective post, to the locked position, whereupon the respective post latch engages with the respective post and retains the respective post in the safety latch mechanism.

20. The method of claim 19, further comprising:

lowering the flip door from the raised position to the lowered position, thereby engaging the corresponding latch eye with the respective post latch, causing the respective post latch to rotate from the locked position to the unlocked position and disengage from the respective post, thereby allowing the respective post to be removed from the respective socket; and removing each respective post of the two posts from the respective socket, thereby causing the respective door latch to rotate to the latched position, thereby engaging with the corresponding latch eye and retaining the flip door in the lowered position.

\* \* \* \* \*